H. R. McNEILL.
MACHINE FOR TONGUING AND GROOVING STAVES.
APPLICATION FILED DEC. 18, 1914.
1,158,949.
Patented Nov. 2, 1915.
3 SHEETS—SHEET 1.
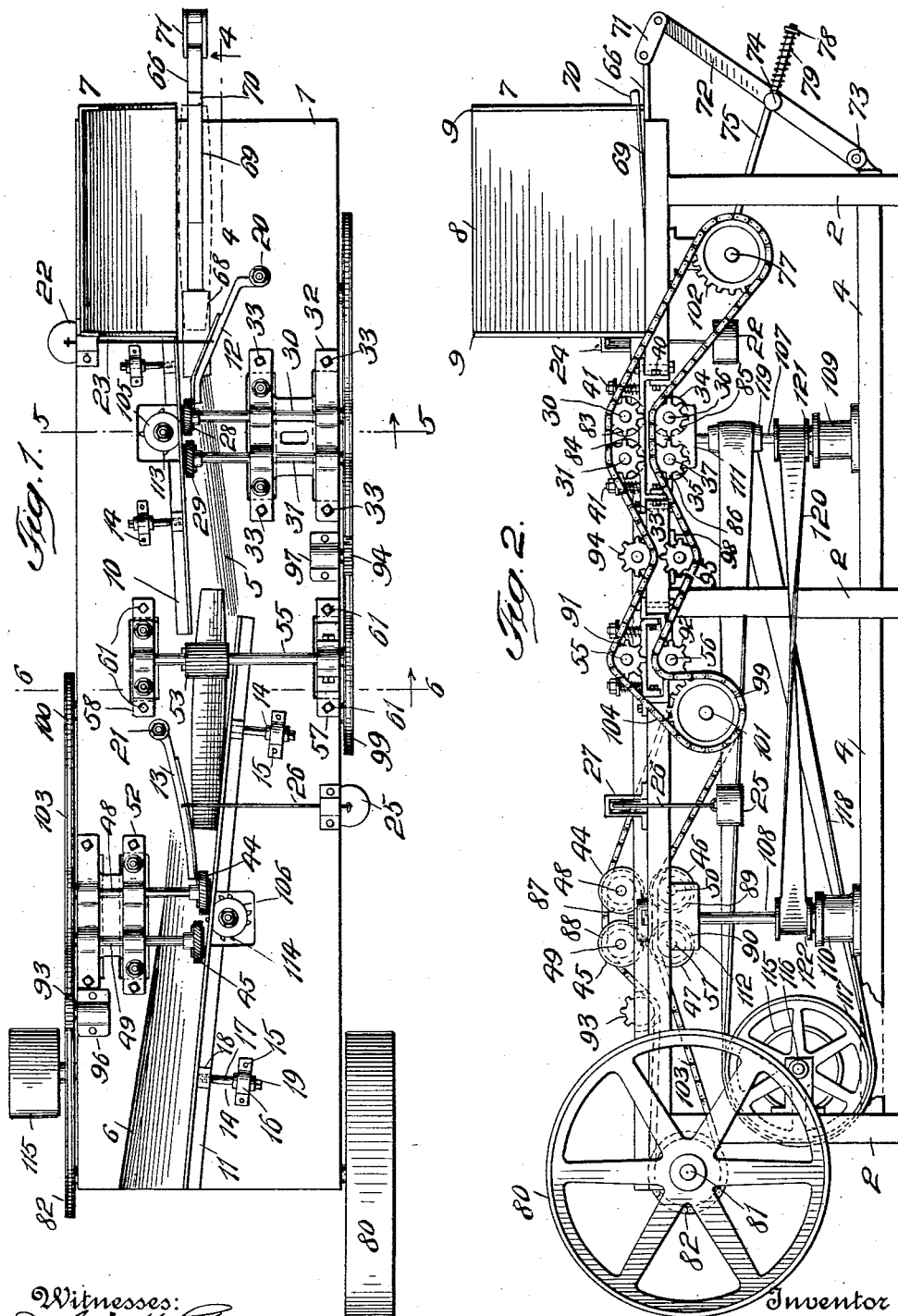
Witnesses:
Inventor
Howard R. McNeill
By his Attorney

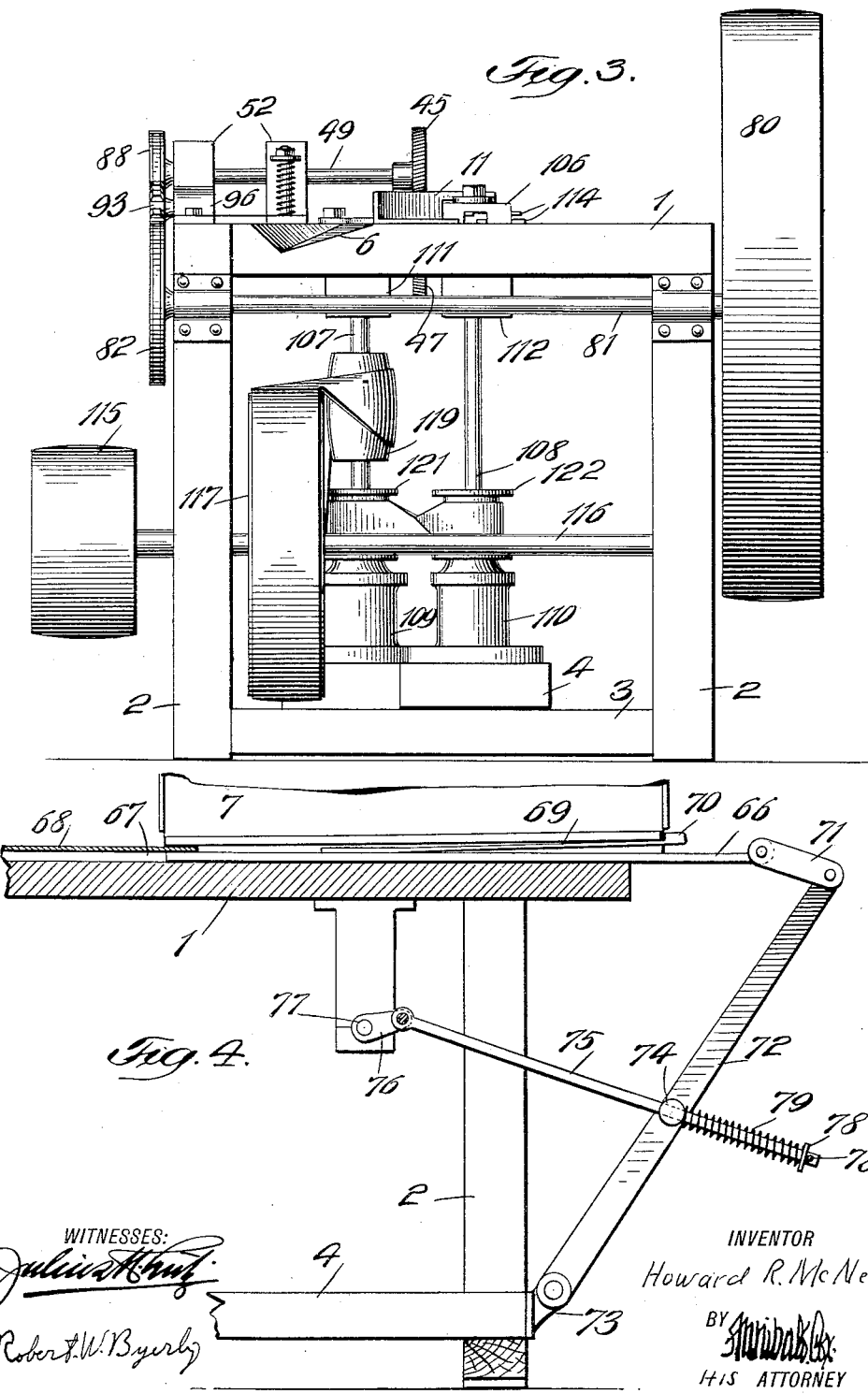

H. R. McNEILL.
MACHINE FOR TONGUING AND GROOVING STAVES.
APPLICATION FILED DEC. 18, 1914.
1,158,949.
Patented Nov. 2, 1915.
3 SHEETS—SHEET 3.
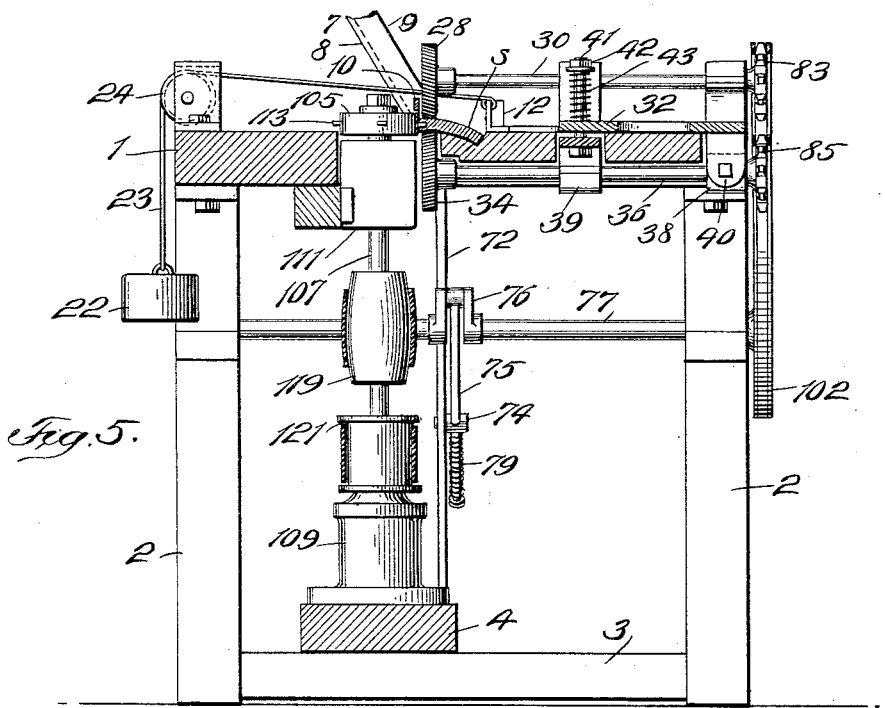
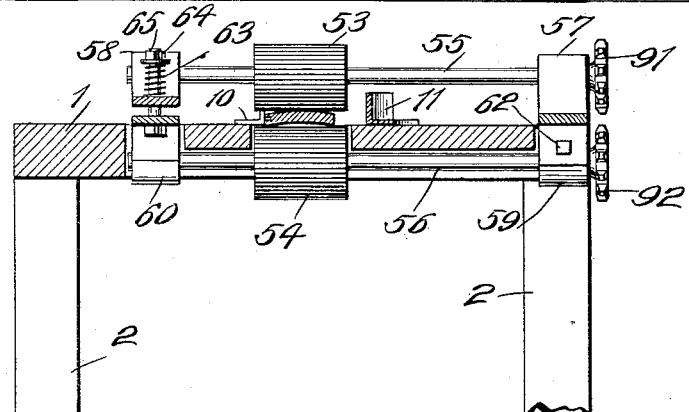
Witnesses:
Inventor
Howard R. McNeill
By his Attorney

UNITED STATES PATENT OFFICE.

HOWARD R. McNEILL, OF EASTON, PENNSYLVANIA.

MACHINE FOR TONGUING AND GROOVING STAVES.

1,158,949. Specification of Letters Patent. Patented Nov. 2, 1915.

Application filed December 18, 1914. Serial No. 877,859.

*To all whom it may concern:*

Be it known that I, HOWARD R. MCNEILL, a citizen of the United States, residing at Easton, in the county of Northampton, in the State of Pennsylvania, have invented new and useful Improvements in Machines for Tonguing and Grooving Staves, of which the following is a specification.

This invention relates to machines for tonguing and grooving staves and has for its object to provide a machine which will rapidly and effectively tongue and groove such staves as are commonly used in the manufacture of barrels and for similar purposes.

Owing to the irregular shape of ordinary barrel staves which have curved edges and are somewhat bent or dished, it is impossible to handle them in an ordinary tonguing and grooving machine. Machines have been devised for tonguing and grooving staves in which two movably supported cutters are simultaneously pressed against the opposite edges of the stave. Owing to the irregularity in curvature, shape and thickness of the staves ordinarily used, this machine has not proved satisfactory and it has been found impossible to operate it at a high rate of speed.

In the machine which I have invented, the stave is directed by a movable guide to feed rollers which are so arranged that they grip it near one edge and press this edge of the stave firmly against a fixed guide through which a cutter supported on a fixed axis projects. The stave is fed forward by these rollers while the groove is cut by the cutter and is then passed between transferring rollers which carry it forward against another movable guide, which directs the stave between second feed rollers, which grasp the stave near the edge which has not been grooved and feed it forward while a tongue is cut upon the other edge of the stave. By means of tonguing and grooving the two edges of the stave successively while the stave is held in each operation by rollers pressing it near the edge which is being cut, I have produced a machine which will accurately tongue and groove irregular shaped barrel staves and will operate with great rapidity.

Other novel features and advantages of my invention will be pointed out in connection with the detailed description of the invention which follows.

A simple and convenient embodiment of my invention thus briefly outlined is illustrated in the annexed drawings, of which—

Figure 1 is a plan view of the machine; Fig. 2 is a side elevation of the machine; Fig. 3 is an end elevation of the machine looking from the discharging end; Fig. 4 is a longitudinal section upon line 4—4 in Fig. 1 taken in the direction of the arrow; Fig. 5 is a transverse section taken upon the line 5—5 in Fig. 1 looking in the direction of the arrow; Fig. 6 is a partial transverse section taken upon line 6—6 in Fig. 1 looking in the direction of the arrow; Fig. 7 is a perspective view of a stave which has been tongued and grooved by the machine.

The frame-work of the machine consists of the table top 1, the vertical legs 2, the transverse braces 3 and the longitudinal braces 4. Two grooves 5, 6 are cut in the upper surface of the table top. Portions of the table top are cut away, as indicated in the drawings, to allow space for the operative parts of the machine which are below the surface of the table top.

Upon the right hand end of the table top 1 (Figs. 1, 2) is the feeding magazine 7 for supporting a pile of staves to be tongued and grooved. This magazine consists of an inclined back 8 (see Fig. 5) and two edges 9.

Upon the surface of the table top 1 are the fixed guides 10, 11 and the movable guides 12, 13. The fixed guides 10, 11, so termed because they remain stationary when the machine is in operation, are attached to the table top by the adjustment devices 14. These consist of the frames 15, screwed to the table top, the tapped blocks 18, secured to the fixed guides and the threaded bolts 17, which pass through holes 16 in the frames 15 and engage the threaded holes in the blocks 18. The bolts 17 are incapable of longitudinal movement relative to the frames and have square heads 19 by which they may be turned. The movable guides 12, 13 are pivoted to the table top at 20 and 21, respectively. The weight 22 is attached to the guide 12 by a flexible string 23, passing over the pulley 24, while the weight 25 is similarly attached to the guide 13 by the string 26 passing over the pulley 27.

The feed rollers 28, 29 are mounted upon the shafts 30, 31, which pass through the bearing frame 32. This bearing frame is attached to the upper surface of the table top 1 by the bolts 33. Directly below the rollers 28, 29 are the rollers 34, 35. These rollers are mounted on the ends of the shafts 36, 37, which pass through the bearing frames 38, 39 (Fig. 5). The bearing frame 38 is pivotally connected with the bearing frame 32 by the bolts 40. The bearing frame 39 is supported by bolts 41 which pass loosely through the bearing frame 32, the nuts 42 and the springs 43. These springs tend to draw the bearing frame 39 upward and consequently draw the lower rollers 34, 35 upwardly toward the upper rollers 28, 29. The shafts 30, 31 and 36, 37 are set to form an angle slightly less than a right angle with fixed guide 10. Consequently the front faces of the rollers 28, 29, 34, 35 are at a slight angle to the guide 10.

The feed rollers 44, 45 and the corresponding lower rollers 46, 47 are mounted upon the shafts 48, 49, 50, 51, which pass through the bearing frame 52 and lower bearing frames precisely like bearing frames 38, 39 in the same way as the rollers and shafts already described. The lower rollers 46, 47 are drawn upward by springs which operate precisely like the springs 43 already described. I prefer to make the rollers 44, 45, 46, 47 slightly larger than the rollers 28, 29, 34, 35. The feed rollers are shorter than the width of a stave, so that they grip the stave near the edge only. The cylindrical surfaces of the feed rollers are obliquely grooved, as indicated in Figs. 1 and 5. The transferring rollers 53, 54 (Fig. 6) are longer than the feed rollers already referred to. These rollers are mounted upon the shafts 55, 56, which pass through the upper bearing frames 57, 58 and the lower bearing frames 59, 60, respectively. The lower bearing frames 59, 60 are attached to the table top by bolts 61. The upper bearing frame 57 is pivotally attached to the frame 59 by bolts 62. The frame 58 is pushed downward by the springs 63, co-acting with the nuts 64 upon the bolts 65 (Fig. 6). The cylindrical surfaces of the rollers 53, 54 are longitudinally grooved.

The feed plunger 66, best shown in Fig. 4, slides in the groove 67 in table top 1. A metal cover plate 68 covers the end of this groove and prevents the plunger 66 from flying upward. Attached to the upper surface of the plunger 66 is the spring 69 which has a raised portion 70 at its extremity which engages the end of the lower stave piled against the feed magazine 7. The outer end of the plunger 66 is pivoted to one end of the link 71, the other end of which is pivoted to the upper end of the lever 72. The lower end of this lever is pivoted to the table at 73. A block 74 is pivotally supported upon the lever 72. This block contains a hole through which passes the connecting rod 75, which is carried by the crank 76 in the shaft 77. The outer end of the rod 75 bears a washer 78 held by a pin 78$^a$. Between washer 78 and the block 74 is a spring 79.

The driving mechanism for operating the feeding mechanism which has been described comprises the pulley wheel 80, to which power is applied from a source not shown. This wheel is mounted upon one end of a shaft 81, upon the opposite end of which is the sprocket wheel 82. Upon the outer ends of the shafts 30, 31, 36, 37, 48, 49, 50, 51, 55, 56 are mounted the sprocket wheels 83, 84, 85, 86, 87, 88, 89, 90, 91, 92, all of which are of the same diameter. The idler sprocket wheels 93, 94, 95 are supported by the bearing frames 96, 97, 98, which are fastened to the table top. Sprocket wheels 99, 100 are of the same size and are mounted upon the opposite ends of the shaft 101, which passes under the table and is supported on bearings extending downwardly from the table top. The sprocket wheel 102 is mounted upon the crank shaft 77. These sprocket wheels are connected by the sprocket chain 103 passing over the sprocket wheels 82, 93, 88, 87, 99, 89, 90, in the order named, and sprocket chain 104 passing over the sprocket wheels 99, 91, 94, 84, 83, 102, 85, 86, 95, 92, in the order named, as indicated in Fig. 2.

The cutting mechanism consists of the cutter heads 105, 106, which are mounted upon the upper ends of the vertical shafts 107, 108. These shafts are supported by the bearings 109, 110, which are mounted upon the horizontal braces 4 (Fig. 5) of the table frame, and the bearings 111, 112, which are attached to blocks attached to the lower surface of the table top. The cutter head 105 bears cutting tools 113 adapted to cut a groove. These tools project through a slot in the fixed guide 10. Cutter head 106 bears cutting tools 114 adapted to cut a tongue. These tools project through a slot in the fixed guide 11.

The driving mechanism for operating the cutters comprises the pulley wheel 115, to which power is applied from a source not shown. The wheel 115 is mounted upon the shaft 116, which likewise bears the pulley wheel 117. A belt 118 connects this pulley wheel 117 with the pulley wheel 119 upon the vertical cutter shaft 107. Cutter shaft 108 is driven by the belt 120, which passes over the pulley wheel 121 upon the shaft 107 and the pulley wheel 122 upon the shaft 108. The wheel 122 is preferably slightly smaller than wheel 121. This belt 120 is crossed so that the cutter heads are rotated in opposite directions.

The operation of the machine is as follows:—The staves to be tongued and grooved are stacked against the magazine 7 with their concave faces downward. The plunger 66 is forced forward by the movement imparted to the lever 72 by the crank 76. The raised portion 70 upon the spring 69 engages the lowest stave in the pile and carries it forward against the movable guide 12, which directs the stave between the feed rollers 28, 29 and 34, 35. These rollers, being pressed together in the manner heretofore described, grasp the stave and maintain their grasp upon it in spite of any irregularities in its thickness. The rollers carry the stave forward and at the same time, owing to the fact that they make an angle with the fixed guide 10, they press each point of the edge of the stave successively against the fixed guide 10 at the point at which the cutting tools 113 project through the guide 10. The cutter 105 is rotated rapidly in an anti-clockwise direction and the cutting tools 113 form a groove in the right hand edge of the stave as it is pressed against the guide 10 by the rollers. Just before the rear end of the stave emerges from the grip of the rollers 29, 35, the forward end of the stave enters between the transferring rollers 53, 54. These rollers carry the stave forward until its forward end engages the movable guide 13 which directs the end of the stave between the feed rollers 44, 45 and 46, 47. These rollers grasp the stave and, owing to their oblique position press the edge of the stave firmly against the fixed guide 11 while they are feeding it forward. The cutter head 106 is rotated in a clockwise direction and the tools 114 cut a tongue upon the left hand edge of the stave while the stave is forced ahead by the rollers. After the stave passes out of engagement with the rollers 45 and 47, it lies in the groove 6 until pushed out by the succeeding stave. The oblique grooves upon the surface of the feed rollers assist in simultaneously forcing the stave forward and holding its edge against the fixed guide at the point at which the cutting takes place. As the feed rollers 28, 29, 34, 35 are shorter than the width of the stave, they grasp the stave near its edge only. This enables them to obtain a firm grip upon it in spite of its dished shape. The position of the stave when held by these rollers is shown at S in Fig. 5. It will be noted that the portion of the stave gripped by the feed rollers is held substantially horizontal so that the edge of the stave is held vertical at the point at which the cutting takes place. In consequence, the groove cut is at all points perpendicular to the edge of the stave. As the feed rollers 44, 45, 46, 47 are likewise shorter than the width of the stave, the tongue cut is at all points perpendicular to the edge of the stave. The result is that the tongues and grooves of staves which have been passed through my machine fit perfectly when placed together to form a barrel or the like. As the upper feed rollers 28, 29 are affixed to the table top and consequently maintain a fixed relation with the cutter head 105, the groove cut by the tools 113 is at all points the same distance from the upper or convex surface of the stave. For a similar reason, the tongue cut by the tools 114 is at all points a uniform distance from the convex surface of the stave. Moreover, the tongues and grooves are cut at a uniform distance from the convex surface of the staves in all staves which are passed through the machine. The result is that when the staves are fitted together to form a barrel or the like, any irregularities which there may be in the thickness of the staves will cause irregularities in the inner surface of the barrel only, where they cannot be seen; and the outer surface of the barrel will be smooth.

I prefer to make the feed rollers 44, 45, 46, 47 slightly larger than the rollers 28, 29, 34, 35 for this reason: If the two sets of rollers are made of the same size, the staves pass more rapidly through the first set of rollers than through the second, since the cutter which is making the groove offers less resistance to the forward movement of the stave than the cutter which is making the tongue. Consequently, if staves be fed into the machine close together, the succeeding staves will catch up with the preceding staves as the latter are passing through the second set of rollers and overlap them. By making the second set of feed rollers slightly larger than the first, I force the staves by the tongue cutter as rapidly as they pass by the groove cutter. In consequence, staves may be fed through the machine close together without fear of catching up or overlapping. The same result may, of course, be obtained by revolving the second set of rollers at a slightly greater velocity than the first set, instead of making them slightly larger. To get the greatest possible efficiency from the machine, I found it desirable to rotate the tongue cutter a little more rapidly than the groove cutter.

If by any accident a stave catches as it is being fed forward by the plunger 66, the spring 79 yields allowing the plunger to remain fixed in spite of the rotation of the crank 76. In this way breakage of the stave or of parts of the feeding device is avoided.

The depth of the groove and the length of the tongue may be easily adjusted by varying the position of the fixed guides 10, 11 by turning the bolts 17 of the adjusting devices 14.

What I claim is:—

1. In a machine for tonguing and grooving staves, the combination of a fixed guide having an aperture, a cutter projecting through said aperture, means for giving the stave a forward movement in a direction oblique to said fixed guide, whereby the forward end of the stave is moved against and along said fixed guide, and rollers oblique to said fixed guide and adjacent to said aperture arranged to grasp the stave when forced forward by said means.

2. In a machine for tonguing and grooving staves, the combination of a fixed guide having an aperture, a cutter projecting through said aperture, means for giving the stave a forward movement in a direction oblique to said fixed guide, whereby the forward end of the stave is moved against and along said fixed guide, and rollers oblique to said fixed guide and adjacent to said aperture arranged to grasp the stave when forced forward by said means, and a movable guide beside said fixed guide arranged to press the forward end of the stave against the fixed guide before it reaches said rollers.

3. In a machine for tonguing and grooving staves, means for giving a stave an initial forward movement, a fixed guide oblique to the direction of movement given the stave by said means and containing an aperture, feed rollers oblique to said fixed guide and adjacent to said aperture, a cutter projecting through said aperture, a movable guide beside said fixed guide arranged to press the forward end of the stave against said fixed guide before it engages said feed rollers, transferring rollers arranged to give the stave a forward movement as it emerges from said feed rollers, a second fixed guide oblique to the direction of movement given the stave by said transferring rollers and arranged to bear against the opposite edge of the stave from that which came in contact with the first fixed guide and containing an aperture, a cutter projecting through said aperture, feed rollers oblique to said second fixed guide and adjacent to said aperture, and a second movable guide beside said second fixed guide arranged to press the forward end of the stave against said second fixed guide before it reaches said second feed rollers.

4. In a machine for tonguing and grooving staves, two cutters, means of less than one-half the width of the stave for grasping a stave near one edge and feeding it forward while pressing each portion of said edge successively against one of said cutters, means of less than one-half the width of the stave for grasping said stave near its other edge and moving it forward while pressing this edge against the other of said cutters.

5. In a machine for tonguing and grooving staves, a tongue cutter and a groove cutter, rollers of axile length less than one-half the width of a stave, arranged to grasp a stave near one edge and feed it forward while bringing each portion of said edge successively in contact with one of said cutters, and rollers of axile length less than one-half the width of a stave, arranged to grasp said stave near its other edge and move it forward while bringing this edge in contact with the other of said cutters, and means for transferring the stave from said first mentioned rollers to said second mentioned rollers.

6. In a machine for tonguing and grooving staves, two cutters, means of less than one-half the width of the stave for grasping the stave near one edge and feeding it forward past one of said cutters, means for giving the stave a transverse movement as it passes said cutter, means for grasping said stave near its other edge, then moving it forward while passing this edge by the other of said cutters, and means for giving the stave a transverse movement while passing this cutter.

7. In a machine for tonguing and grooving barrel staves, a tongue cutter and a groove cutter, and fixed guides adjacent respectively to said cutters, rollers of axile length less than one-half the width of the staves and oblique to said fixed guides adjacent to said cutters arranged to grasp the stave near one edge and feed it forward while bringing each portion of said edge successively in contact with said cutter, other rollers of axile length less than one-half the width of the stave oblique to the fixed guide adjacent to the other of said cutters arranged to grasp said stave near its other edge and move it forward while bringing this edge in contact with said cutter, and means for transferring the stave from said first mentioned rollers to said second mentioned rollers.

8. In the manufacture of barrel staves, a method consisting in shaping and bilging the stave and thereafter grasping the stave by one edge and passing this edge obliquely against a guide which controls the engagement of a cutter with this edge of the stave.

9. A method of tonguing and grooving a bilged stave comprising passing said stave between rollers which grip it near one edge only and carry that edge in contact with a cutter, and then passing it between rollers which grasp it near the other edge only and carry that edge in contact with a cutter.

10. A method of tonguing and grooving a bilged stave comprising passing said stave between rollers which grasp it near one edge only and carry that edge obliquely against a guide which controls the engagement of a cutter with that edge of the stave and then passing it between rollers which grasp it near the other edge only and carry that edge obliquely against a guide which controls the engagement of a cutter with that edge instead.

HOWARD R. McNEILL.

Witnesses:
 EARL L. SNOVER,
 HELEN A. CREVELING.

Copies of this patent may be obtained for five cents each, by addressing the "Commissioner of Patents, Washington, D. C."